(12) United States Patent
Park et al.

(10) Patent No.: US 10,551,680 B2
(45) Date of Patent: Feb. 4, 2020

(54) LIQUID CRYSTAL DISPLAY DEVICE

(71) Applicant: Samsung Display Co. Ltd., Yongin-si (KR)

(72) Inventors: Heung Shik Park, Seoul (KR); Jae Soo Jang, Suwon-si (KR); Kyeong Jong Kim, Suwon-si (KR); Ho Kil Oh, Seoul (KR); Ki Chul Shin, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 78 days.

(21) Appl. No.: 15/486,506

(22) Filed: Apr. 13, 2017

(65) Prior Publication Data

US 2017/0343860 A1    Nov. 30, 2017

(30) Foreign Application Priority Data

May 24, 2016   (KR) .................. 10-2016-0063473

(51) Int. Cl.
   *G02F 1/1337*   (2006.01)
   *G02F 1/1335*   (2006.01)
   (Continued)

(52) U.S. Cl.
   CPC ...... *G02F 1/133707* (2013.01); *G02F 1/1368* (2013.01); *G02F 1/133512* (2013.01);
   (Continued)

(58) Field of Classification Search
   CPC ......... G02F 1/133707; G02F 1/134309; G02F 1/136286; G02F 1/133512; G02F 1/1368;
   (Continued)

(56) References Cited

U.S. PATENT DOCUMENTS 6,825,892 B2   11/2004   Inoue et al.
7,880,949 B1 *  2/2011   Chu-Ke ............. G02F 1/13624
                                                   349/43
(Continued)

FOREIGN PATENT DOCUMENTS

JP          5116879      10/2012
KR     1020110117553     10/2011
(Continued)

OTHER PUBLICATIONS

Baek-woon Lee, et al., "Alignment of Liquid Crystals with Patterned Isotropic Surfaces", Science, (Mar. 30, 2001), vol. 291, pp. 2576-2580.
(Continued)

*Primary Examiner* — Charles S Chang
(74) *Attorney, Agent, or Firm* — Cantor Colburn LLP

(57) ABSTRACT

A liquid crystal display device includes a first substrate, and a first pixel which is disposed on the first substrate, and includes a pixel area and a circuit area adjacent to the pixel area where the first pixel further includes a first pixel electrode in which a slit extending in a first direction is defined, a first sub-pixel electrode disposed on one side of the slit, and a second sub-pixel electrode disposed on another side of the slit, the slit, the first sub-pixel electrode and the second sub-pixel electrode are disposed in the pixel area, and the first sub-pixel electrode and the second sub-pixel electrode are directly connected to each other in the circuit area.

20 Claims, 19 Drawing Sheets

(51) Int. Cl.
*G02F 1/1343* (2006.01)
*G02F 1/1362* (2006.01)
*G02F 1/1368* (2006.01)

(52) U.S. Cl.
CPC .. *G02F 1/134309* (2013.01); *G02F 1/136286* (2013.01); *G02F 2001/134345* (2013.01); *G02F 2001/136218* (2013.01); *G02F 2001/136222* (2013.01); *G02F 2201/121* (2013.01); *G02F 2201/123* (2013.01)

(58) Field of Classification Search
CPC ........ G02F 2001/134345; G02F 2001/136218; G02F 2001/136222; G02F 2201/121; G02F 2201/123
USPC ......................................................... 349/139

See application file for complete search history.

(56) References Cited

U.S. PATENT DOCUMENTS

| | | | |
|---|---|---|---|
| 8,854,581 | B2 | 10/2014 | Yoshida et al. |
| 9,176,344 | B2 | 11/2015 | Jeong et al. |
| 9,389,468 | B2 | 7/2016 | Miyakawa et al. |
| 2013/0101755 | A1* | 4/2013 | Lee .................. G02F 1/133707 428/1.23 |
| 2014/0204326 | A1* | 7/2014 | Wu .................. G02F 1/133707 349/143 |
| 2014/0375918 | A1 | 12/2014 | Yoshida et al. |

FOREIGN PATENT DOCUMENTS

| | | |
|---|---|---|
| KR | 1020150002509 | 1/2015 |
| WO | 2011024703 | 3/2011 |

OTHER PUBLICATIONS

Frank Schreiber, "Structure and growth of self-assembling monolayers", Progress in Surface Science, vol. 65, (2000), pp. 151-256.

* cited by examiner

LIQUID CRYSTAL DISPLAY DEVICE

This application claims priority to Korean Patent Application No. 10-2016-0063473, filed on May 24, 2016, and all the benefits accruing therefrom under 35 U.S.C. § 119, the content of which in its entirety is herein incorporated by reference.

BACKGROUND

1. Field

Exemplary embodiments of the invention relate to a liquid crystal display device.

2. Description of the Related Art

A significance of a display device is increasing along with a development of multimedia. Accordingly, various kinds of the display device such as a liquid crystal display device ("LCD") and an organic light emitting display ("OLED") are used.

Among the various kinds of display devices, the LCD is one of the flat panel display devices that are most widely used at present. The LCD generally includes two substrates in which field generating electrodes such as pixel electrodes and common electrodes are formed, and a liquid crystal layer interposed therebetween. The LCD displays an image by respectively applying voltages to the field generating electrodes to generate an electric field in a liquid crystal layer, by determining a direction of liquid crystal molecules of the liquid crystal layer through the electric field, and by controlling a polarization of incident light.

Among the LCDs, a vertical alignment mode LCD, in which long axes of liquid crystals are perpendicular to upper and lower substrates in a state in which no electric field is applied, has attracted attention due to a large contrast ratio and a wide reference viewing angle. Here, the reference viewing angle means a viewing angle at which the contrast ratio is 1:10, or an inter-gradation luminance inversion limit angle.

In an LCD of a divided structure, in order to make a side visibility closer to a front visibility, the transmittance may be differently set in a single pixel electrode by dividing the single pixel electrode into two sub-pixel electrodes and respectively applying voltages to the two sub-pixel electrodes.

SUMMARY

Exemplary embodiments of the invention provide a liquid crystal display device ("LCD") which improves visibility and enhances the liquid crystal control, by eliminating a side surface light leakage occurring in a state of low gradation.

According to the exemplary embodiments of the invention, since a vertical slit is defined in a pixel electrode, it is possible to eliminate the side surface light leakage occurring in a state of low gradation and to enhance the liquid crystal control.

Further, the visibility may be improved by forming the azimuth angle of the liquid crystal molecules located in the vertical slit to be close to about 0 degree in the state of low gradation.

An exemplary embodiment of the invention discloses an LCD including a first substrate, and a first pixel which is disposed on the first substrate, and includes a pixel area and a circuit area adjacent to the pixel area. The first pixel may further include a first pixel electrode in which a slit extending in a first direction is defined, a first sub-pixel electrode located on one side of the slit, and a second sub-pixel electrode located on another side of the slit, the slit, the first sub-pixel electrode and the second sub-pixel electrode may be disposed in the pixel area, and the first sub-pixel electrode and the second sub-pixel electrode may be directly connected to each other in the circuit area.

An exemplary embodiment of the invention also discloses an LCD including a first substrate, and a first pixel which is disposed on the first substrate and may be defined by a circuit area and a pixel area adjacent to the circuit area. The first pixel may include a first pixel electrode which includes a switching element disposed in the circuit area and a contact electrically connected to the switching element, a slit extending in a first direction is defined in the first pixel electrode, and the first pixel electrode further include a first sub-pixel electrode located on one side of the slit, and a second sub-pixel electrode located on another side of the slit, the slit, the first sub-pixel electrode and the second sub-pixel electrode are disposed in the pixel area, and the contact may be disposed in the circuit area, and the first sub-pixel electrode and the second sub-pixel electrode are directly connected to each other in the circuit area.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
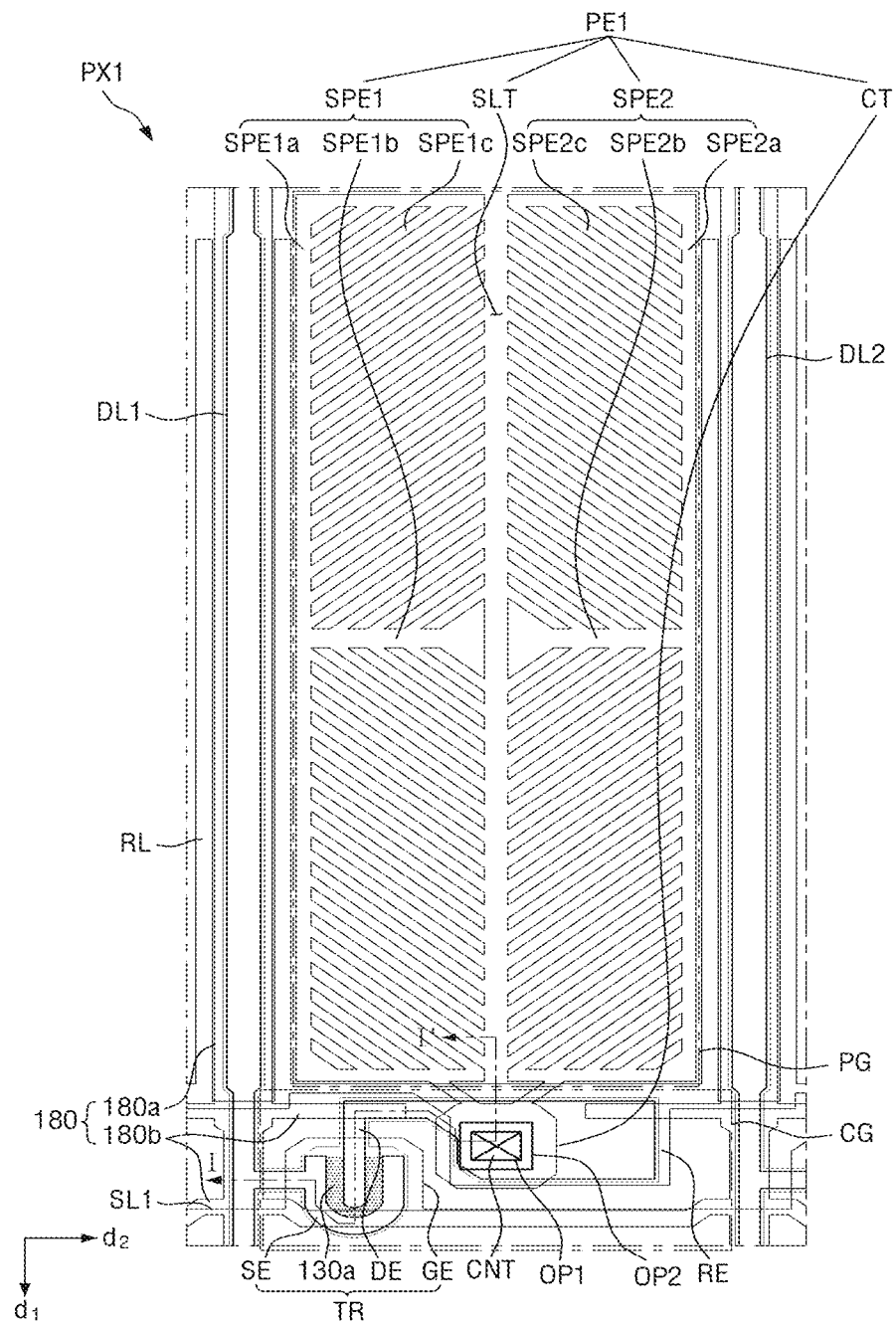
FIG. 1 is a plan view illustrating an exemplary embodiment of a first pixel of a liquid crystal display device ("LCD") according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular exemplary embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a plan view illustrating a first pixel of a liquid crystal display device ("LCD") according to an exemplary embodiment of the invention.

Referring to FIG. 1, a first pixel PX1 may be connected to a first data line DL1 and a first scan line SL1. The first data line DL1 may extend in a first direction d1. The first data line DL1 may receive provision of the data signal from the data driver, and may provide the data signal to the first pixel PX1. The first scan line SL1 may extend in a second direction d2 different from the first direction d1. The first scan line SL1 may receive the first scan signal S1 from a scan driver, and may provide the first scan signal S1 to the first pixel PX1. The first direction d1 may perpendicularly intersect the second direction d2. Referring to FIG. 1, the first direction d1 is illustrated as a column direction and the second direction d2 is illustrated as a row direction, for example.

The first pixel PX1 may be defined by a pixel area PG and a circuit area CG. The pixel area PG may be adjacent to the circuit area CG. The first pixel PX1 may include a switching element TR disposed in the circuit area CG, and a first pixel electrode PE1 electrically connected to the switching element TR.

The switching element TR may be electrically connected to the first scan line SL1, the first data line DL1 and the first pixel electrode PH. In an exemplary embodiment, the switching element TR may be a three-terminal element such as a thin film transistor ("TFT"). Hereinafter, an example in which the switching element TR is a TFT will be described. A gate electrode GE of the switching element TR may be electrically connected to the first scan line SL1, and a source electrode SE thereof may be electrically connected to the first data line DL1. The drain electrode DE of the switching element TR may be electrically connected to the first pixel electrode PE1. As a result, the switching element TR is turned on in accordance with the scan signal provided from the first scan line SL1, and may supply the data signal, which is provided from the first data line DL1, to the first pixel electrode PE1.

The first pixel electrode PE1 may overlap a common electrode CE (refer to FIG. 2) in the perpendicular direction with reference to a lower substrate 110 (refer to FIG. 2) to be described later. Therefore, the first pixel electrode PE1 may be capacitively coupled with a common electrode CE to be described later.

A slit SLT may be defined in the first pixel electrode PE1 which includes a first sub-pixel electrode SPE1, a second sub-pixel electrode SPE2, and a contact CT.

The slit SLT may extend along the first direction d1. The slit SLT is disposed between the first sub-pixel electrode SPE1 and the second sub-pixel electrode SPE2. In an exemplary embodiment, the slit SLT may be defined at the center of the first pixel electrode PE1, such that the first pixel electrode PE1 may be bisected into the first sub-pixel electrode SPE1 and the second sub-pixel electrode SPE2 by the slit SLT1.

The first sub-pixel electrode SPE1 may be disposed on one side (e.g., left side) of the slit SLT. The second sub-pixel electrode SPE2 may be disposed on the other side (e.g., right side) of the slit SLT. In an exemplary embodiment, the first sub-pixel electrode SPE1 may be symmetrical with the second sub-pixel electrode SPE2 with reference to the slit SLT. However, the invention is not limited thereto, and the first sub-pixel electrode SPE1 may be disposed to intersect the second sub-pixel electrode SPE2.

The first sub-pixel electrode SPE1 includes a first stem SPE1a extending in the first direction d1, a second stem SPE1b extending in the second direction d2, and a plurality of first branches SPE1c extending from at least one of the first stem SPE1a and the second stem SPE1b.

The second sub-pixel electrode SPE2 may includes a third stem SPE2a extending in the first direction d1, a fourth stem SPE2b extending in the second direction d2, and a plurality of second branches SPE1c extending from at least one of the third stem SPE2a and the fourth stem SPE2b.

The slit SLT, the first sub-pixel electrode SPE1, and the second sub-pixel electrode SPE2 may be disposed in the pixel area PG of the first pixel PX1.

The contact CT may be directly connected to the first sub-pixel electrode SPE1 and the second sub-pixel electrode SPE2. In this specification, when expressed as "being directly connected", it means both of the case of being physically connected as well as the case of being electrically connected. The contact CT may be disposed in the circuit area CG. Accordingly, the first sub-pixel electrode SPE1 may be directly connected to the second sub-pixel electrode SPE2 in the contact CT disposed in the circuit area CG. However, the first sub-pixel electrode SPE1 is not physically connected to the second sub-pixel electrode SPE2 in the pixel area PG.

The contact CT may be directly connected to the drain electrode DE of the switching element TR. As a result, the data signal provided from the first data line DL1 through the switching operation of the switching element TR may be provided to the first sub-pixel electrode SPE1 and the second sub-pixel electrode SPE2 through the contact CT. In an exemplary embodiment, when the contact CT is disposed in the circuit area CG, a position of the contact CT is not necessarily limited to the position illustrated in FIG. 1.

The first pixel electrode PE1 will be described in more detail with reference to FIG. 5.

Figure 2:
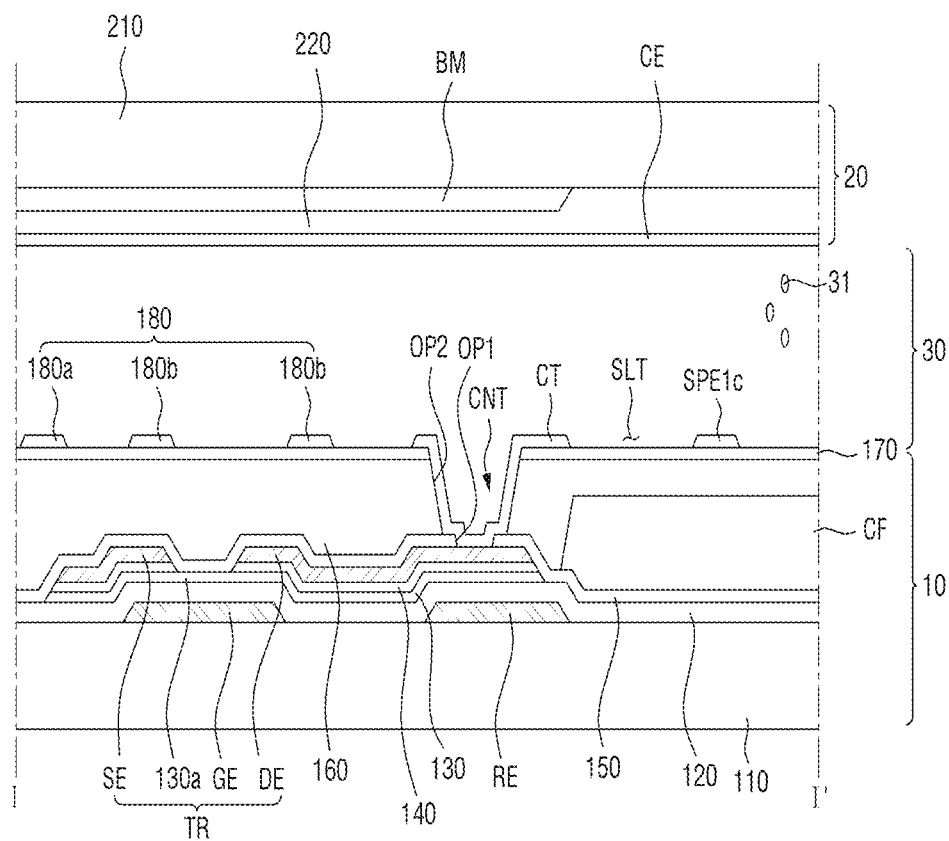
FIG. 2 is a cross-sectional view taken along a line I-I' of FIG. 1.
Figure 3:
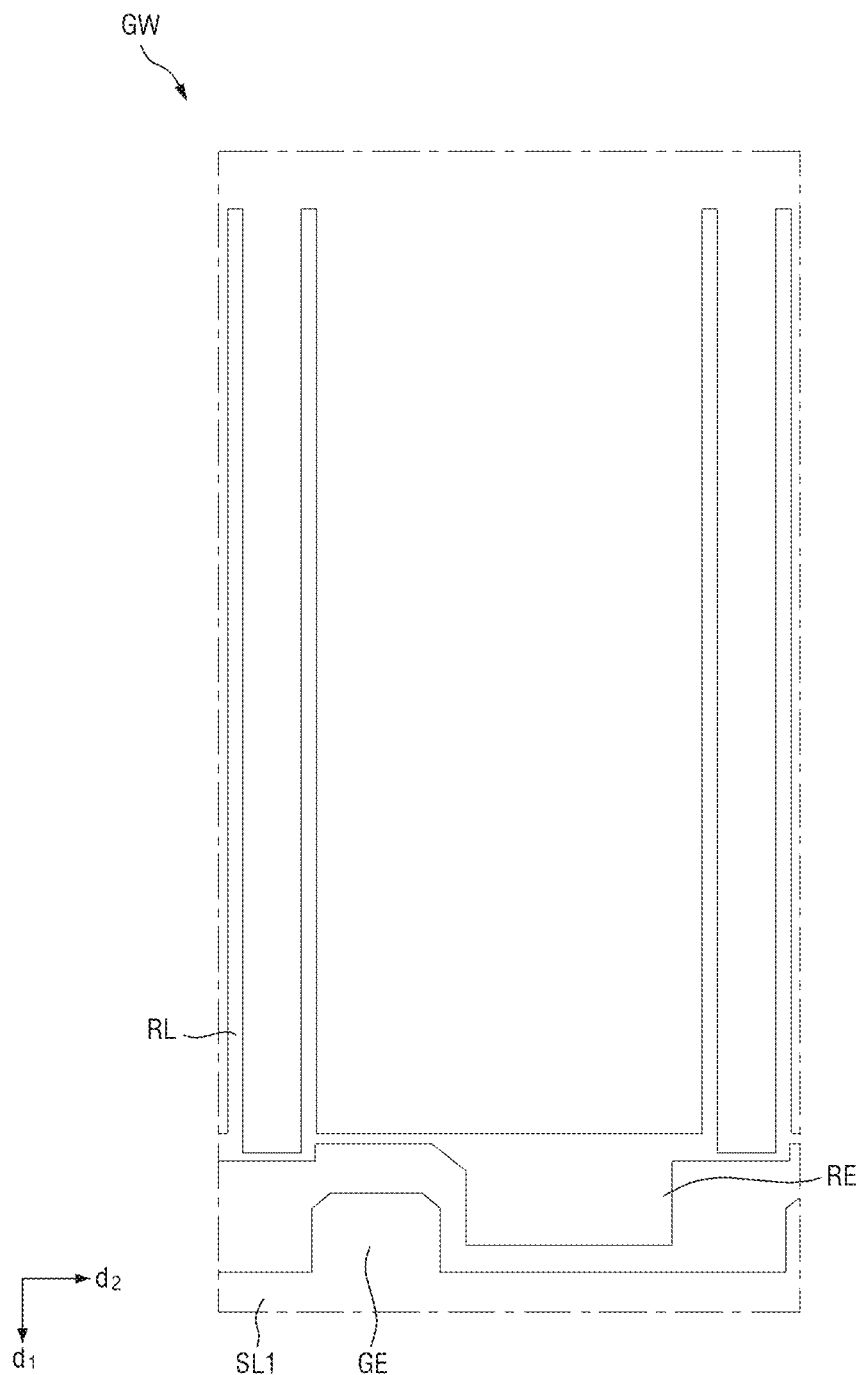
FIG. 3 is a plan view illustrating a gate conductor illustrated in FIG. 1.
Figure 4:
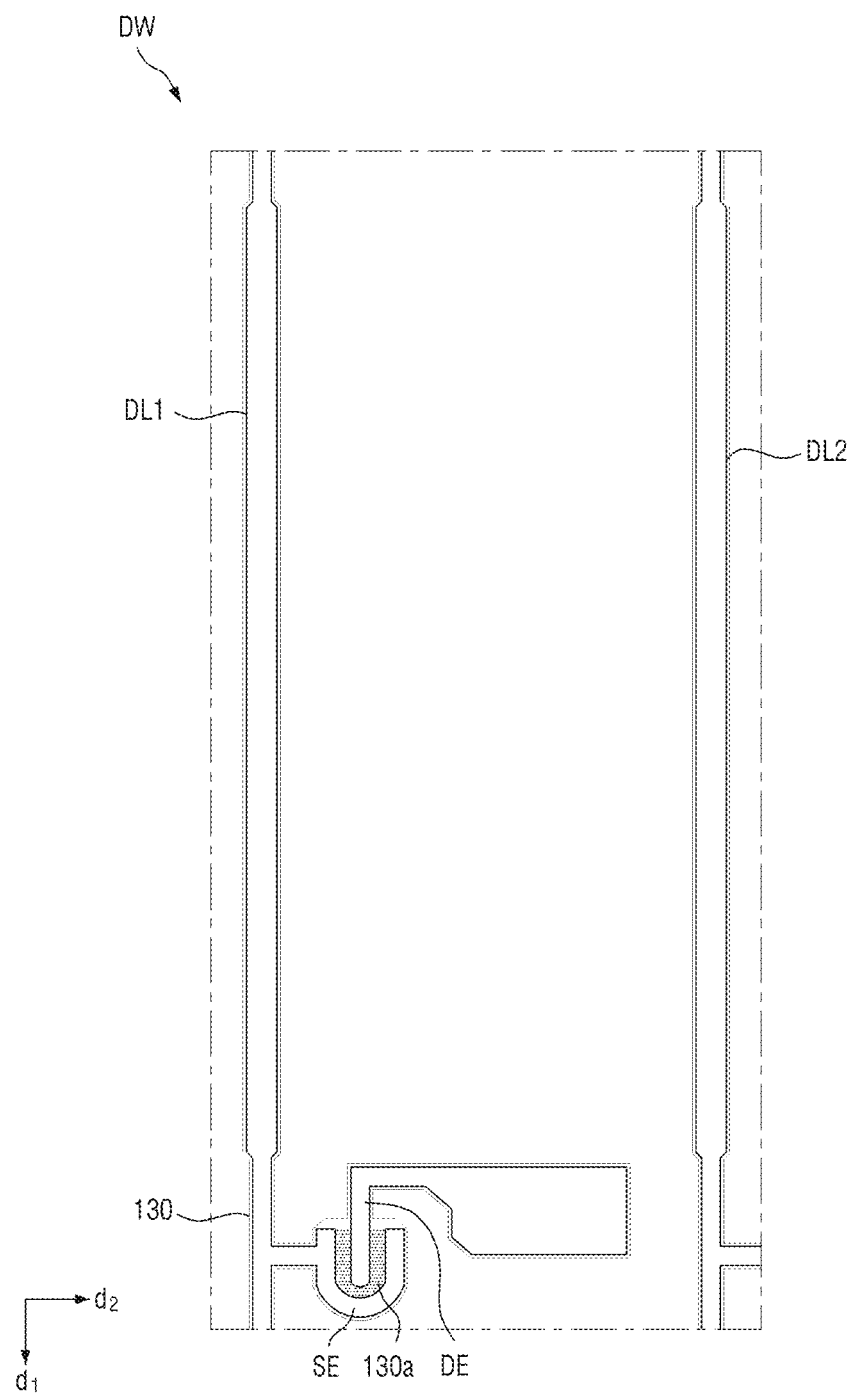
FIG. 4 is a plan view illustrating a data conductor illustrated in FIG. 1.

FIG. 2 is a cross-sectional view taken along line I-I' of FIG. 1. FIG. 3 is a plan view illustrating the gate conductor illustrated in FIG. 1. FIG. 4 is a plan view illustrating the data conductor illustrated in FIG. 1.

Referring to FIGS. 2 to 4, the lower display panel 10 may be disposed to face the upper panel 20. The liquid crystal layer 30 may be interposed between the lower display panel 10 and the upper display panel 20, and may include a plurality of liquid crystal molecules 31. In an exemplary embodiment, the lower display panel 10 may be bonded to the upper display panel 20 via sealing.

First, the lower display panel 10 will be described.

In an exemplary embodiment, the lower substrate 110 may be a transparent insulating substrate. In an exemplary embodiment, the transparent insulating substrate may include a glass substrate, a quartz substrate, a transparent resin substrate or the like, for example.

A gate conductor GW may be disposed on the lower substrate 110. The gate conductor GW may include a first scan line SL1 and a gate electrode GE. The first scan line SL1 may extend along the second direction d2 on the lower substrate 110.

The gate electrode GE is disposed on the lower substrate 110 and is connected to the first scan line SL1. The gate electrode GE may be disposed in the same layer as the first scan line SL1. The gate electrode GE may protrude from the first scan line SL1. The gate electrode GE is included in a switching element TR which will be described later.

The gate conductor GW may further include a storage line RL and a storage electrode RE. In an exemplary embodiment, referring to FIG. 3, the storage line RL and the storage electrode RE may be disposed in the same layer as the gate electrode GE and the first scan line SL1. The storage line RL may wrap the first pixel electrode PE1. The storage electrode RE may extend from the storage line RL. In an exemplary embodiment, the storage electrode RE may protrude from the storage line RL. The storage electrode RE may overlap at least one of the first pixel electrode PE1 and the shielding electrode 180 in a plan view, i.e., a direction perpendicular to a plane of the lower substrate 110. Accordingly, the first pixel PX1 may further include a storage capacitor that is capacitively coupled between at least one of the storage line RL and the storage electrode RE and at least one of the first pixel electrode PE1 and the shielding electrode 180.

In an exemplary embodiment, the gate conductor GW, that is, the first scan line SL1, the gate electrode GE, the storage line RL and the storage electrode RE may include a single film including a conductive metal including aluminium (Al), copper (Cu), molybdenum (Mo), chromium (Cr), titanium (Ti), tungsten (W), molybdenum tungsten (MoW), molybdenum titanium (MoTi) and copper/molybdenum titanium (Cu/MoTi). In other exemplary embodiments, the gate conductor GW may include a double film including at least two elements thereof or a triple film including three elements thereof, for example. In an exemplary embodiment, the first scan line SL1, the gate electrode GE, the storage line RL and the storage electrode RE may be simultaneously provided through the same mask process.

The gate insulating film 120 may be disposed on the gate conductor GW. In an exemplary embodiment, the gate insulating film 120 may include silicon nitride (SiNx), silicon oxide (SiOx) or the like, for example. The gate insulating film 120 may have a multi-film structure including at least two insulating layers having different physical properties.

The data conductor DW may be disposed on the gate insulating film 120. The data conductor DW may include a semiconductor layer 130, a first data line DL1, a second data line DL2, a source electrode SE and a drain electrode DE.

The semiconductor layer 130 may be disposed on the gate insulating film 120. The semiconductor layer 130 may include a semiconductor pattern 130a that defines a channel area of the switching element TR. The semiconductor layer 130 may include an oxide semiconductor. In an exemplary embodiment, the semiconductor layer 130 may include one selected from an oxide semiconductor including In—Ga—Zinc-Oxide ("IGZO"), ZnO, ZnO2, CdO, SrO, SrO2, CaO, CaO2, MgO, MgO2, InO, In2O2, GaO, Ga2O, Ga2O3, SnO, SnO2, GeO, GeO2, PbO, Pb2O3, Pb3O4, TiO, TiO2, Ti2O3, and Ti3O5, for example. In another exemplary embodiment, the semiconductor layer 130 may include amorphous silicon, polycrystalline silicon or the like, for example.

The data conductor DW may further include a resistive contact layer 140. The resistive contact layer 140 may be disposed on the semiconductor layer 130. In an exemplary embodiment, the resistive contact layer 140 may include a material such as n$^+$ hydrogenated amorphous silicon doped with n-type impurities such as phosphorus at a high concentration, or may include silicide, for example. In another exemplary embodiment, the resistive contact layer 140 may be omitted when the semiconductor layer 130 includes an oxide semiconductor.

The first data line DL1, the second data line DL2, the source electrode SE and the drain electrode DE may be disposed on the gate insulating film 120 and the resistive contact layer 140. The first data line DL1 and the second data line DL2 may extend in the first direction d1 on the lower substrate 110. The first data line DL1 is adjacent to the second data line DL2.

The source electrode SE branches from the first data line DL1 and may at least partially overlap the gate electrode GE in a plan view. The drain electrode DE overlaps the gate electrode GE in a plan view, and may be spaced apart from the source electrode SE at a predetermined distance. In FIG. 4, although the source electrode SE is illustrated to have a U-shape and the drain electrode DE is illustrated as being surrounded by the source electrode SE, the invention is not limited thereto.

The source electrode SE, the drain electrode DE, the semiconductor pattern 130a and the gate electrode GE form a switching element TR. The source electrode SE of the switching element TR may be connected to the first data line DL1. The drain electrode DE of the switching element TR may be directly connected to the contact CT of the first pixel electrode PE1 through the contact hole CNT. The channel area of the switching element TR may be disposed between the source electrode SE and the drain electrode DE in accordance with the scan signal provided from the first scan line SL1 through the gate electrode GE. The drain electrode DE may overlap the storage electrode RE in the plan view.

In an exemplary embodiment, the data conductor DW may include a single film selected from a conductive metal including aluminium (Al), copper (Cu), molybdenum (Mo), chromium (Cr), titanium (Ti), tungsten (W), molybdenum tungsten (MoW), molybdenum titanium (MoTi) and copper/molybdenum titanium (Cu/MoTi), or may include a double film including at least two elements thereof or a triple film including three elements thereof, for example. However, the data conductor DW may include several different metals or conductors, without being limited thereto.

In an exemplary embodiment, referring to FIG. 4, the data conductor DW may be provided simultaneously through the same mask process. In this case, the first data line DL1, the second data line DL2, the source electrode SE and the drain electrode DE may have substantially the same form as the semiconductor layer 130, except the semiconductor pattern 130a.

The first passivation film 150 may be disposed on the first data line DL1, the second data line DL2, the source electrode SE and the drain electrode DE. A first opening OP1 that exposes a part of the drain electrode DE may be defined in the first passivation film 150. In an exemplary embodiment, the first passivation film 150 may include an inorganic insulating material such as silicon nitride and silicon oxide. The first passivation film 150 may prevent the pigment of the organic insulating film 160 to be described later from flowing into the semiconductor pattern 130a.

The color filter CF may be disposed on the first passivation film 150. The color filter CF may display one of the primary colors such as red, green and blue, but is not limited thereto. The color filter CF may include a material that displays different colors for each of the adjacent pixels. As illustrated in FIG. 2, the color filter CF may be disposed on the lower substrate 110, but may be disposed on the upper substrate 210.

The organic insulating film 160 may be disposed on the first passivation film 150. A second opening OP2 that overlaps the first opening OP1 in the plan view and exposes a part of the drain electrode DE may be defined in the organic insulating film 160. The organic insulating film 160 may include an organic material that has excellent flattening characteristics and photosensitivity. The organic insulating film 160 may be omitted.

The second passivation film 170 may be disposed on the organic insulating film 160. In an exemplary embodiment, the second passivation film 170 may include an inorganic insulating material such as silicon nitride and silicon oxide. The second passivation film 170 may be omitted.

The first pixel electrode PE1 may be disposed on the second passivation film 170. The first pixel electrode PE1 may include a transparent conductive material such as indium tin oxide ("ITO") or indium zinc oxide ("IZO"), or a reflective metal such as aluminium, silver, chromium or an alloy thereof. The first pixel electrode PE1 will be described later with reference to FIG. 5.

A shielding electrode 180 may be disposed on the second passivation film 170. The shielding electrode 180 may be disposed in the same layer as the pixel electrode PE, but is electrically insulated from the pixel electrode PE. In an exemplary embodiment, the shielding electrode 180 may include a transparent conductive material such as ITO or IZO, or a reflective metal such as aluminium, silver, chromium or an alloy thereof. In an exemplary embodiment, the shielding electrode 180 may be provided simultaneously by the same masking process as the pixel electrode PE.

The shielding electrode 180 may include a first sub-shielding electrode 180a that overlaps a plurality of data lines including the first data line DL1 and the second data line DL2 in the plan view. The shielding electrode 180 may include a second sub-shielding electrode 180b that overlaps a plurality of scan lines including the first scan line SL1 in the plan view. Thus, the first sub-shielding electrode 180a may extend substantially in the first direction d1, and the second sub-shielding electrode 180b may extend substantially in the second direction d2. The first sub-shielding electrode 180a may be electrically connected to the second sub-shielding electrode 180b.

Thus, the first sub-shielding electrode 180a may prevent the light leakage phenomenon caused by coupling between a plurality of data lines and a plurality of pixel electrodes adjacent to each data line. In addition, the second sub-shielding electrode 180b may prevent the light leakage phenomenon caused by coupling between the plurality of scan lines and the plurality of pixel electrodes adjacent to each scan line.

Although it is not illustrated in the drawings, a first alignment film may be disposed on the pixel electrode PE and the shielding electrode 180. The first alignment film may include polyimide or the like.

Next, the upper display panel 20 will be described.

The upper substrate 210 may face the lower substrate 110. In an exemplary embodiment, the upper substrate 210 may include a transparent glass, plastic or the like, and may include the same material as the lower substrate 110.

A black matrix BM may be disposed on the upper substrate 210 to prevent light from being transmitted through areas other than the pixel area. In the exemplary embodiment, the black matrix BM may include an organic material or a metal material including chromium.

A flattened layer 220 may be disposed on the upper substrate 210 and the black matrix BM. The flattened layer 220 may include an insulating material, and may be omitted in other exemplary embodiments.

The common electrode CE may be disposed on the flattened layer 220. The common electrode CE may be disposed to overlap the pixel electrode PE in the plan view. In an exemplary embodiment, the common electrode CE may be in the form of a panel. In an exemplary embodiment, the common electrode CE may include a transparent conductive material such as ITO or IZO, or a reflective metal such as aluminium, silver, chromium or an alloy thereof, for example.

Although it is not illustrated in the drawings, a second alignment film may be disposed on the common electrode CE. The second alignment film may include polyimide or the like.

Hereinafter, the liquid crystal layer 30 will be described.

The liquid crystal layer 30 includes a plurality of liquid crystal molecules 31 having dielectric anisotropy and refractive index anisotropy. In an exemplary embodiment, the plurality of liquid crystal molecules 31 may be arranged in the plan view in a state in which no electric field is applied to the liquid crystal layer 30. In an exemplary embodiment, the plurality of liquid crystal molecules 31 may change the polarization of light by rotating or tilting in a specific direction, when an electric field is generated between the lower substrate 110 and the upper substrate 210.

Figure 5:
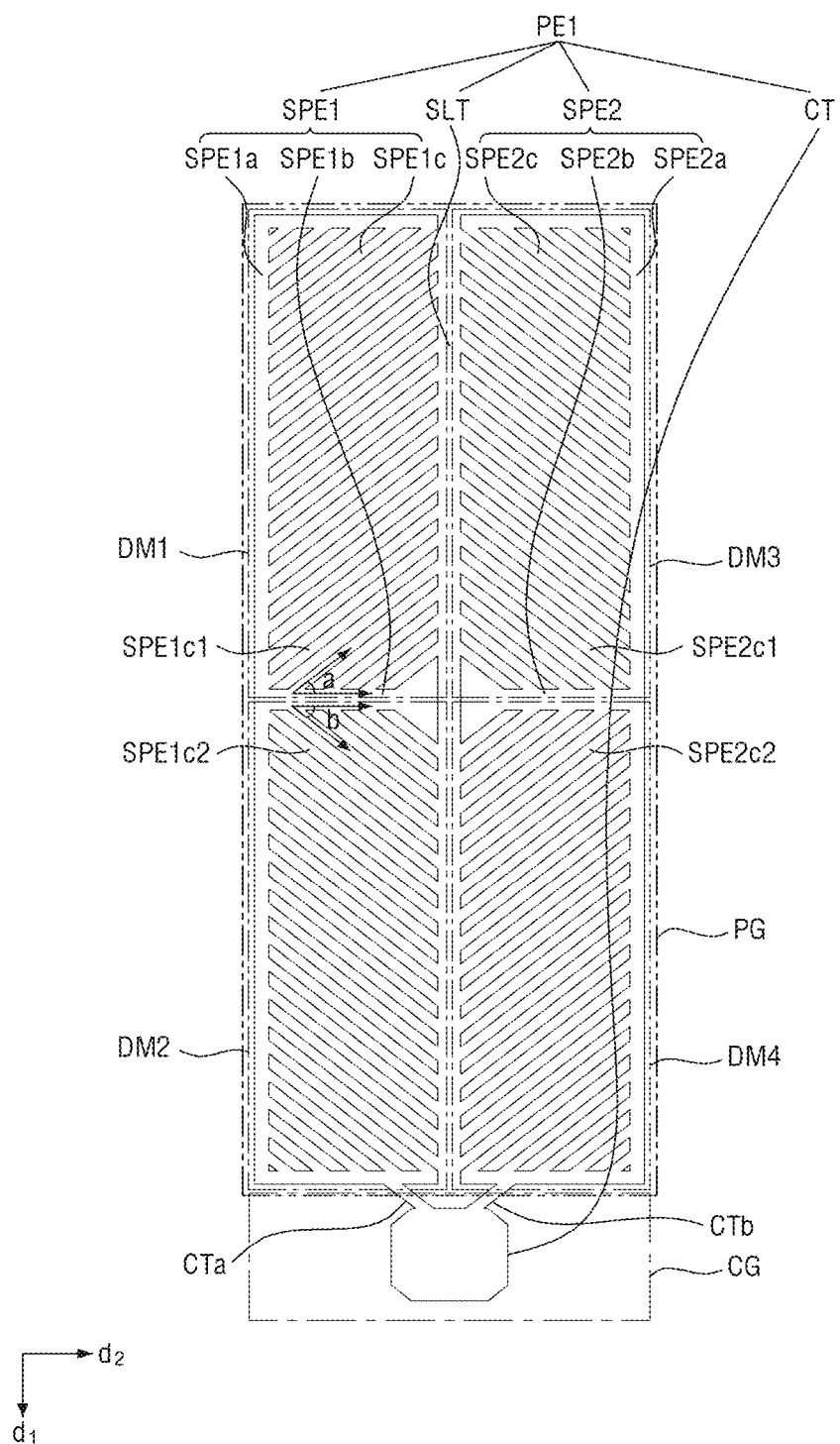
FIG. 5 is a plan view illustrating a first pixel electrode illustrated in FIG. 1.

FIG. 5 is a plan view illustrating the first pixel electrode illustrated in FIG. 1. However, the pixel area PG and the circuit area CG illustrated in FIG. 5 are terms that define the first pixel PX1, but they will be illustrated in FIG. 5 for convenience of explanation.

Referring to FIG. 5, the first pixel electrode PE1 includes a first sub-pixel electrode SPE1, a second sub-pixel electrode SPE2 and a slit SLT that are disposed in the pixel area PG. Further, the first pixel electrode PE1 may further include a contact CT disposed in the circuit area CG.

The first sub-pixel electrode PE1 may include a first stem SPE1a extending in the first direction d1, and a second stem SPE1b extending in the second direction d2. In an exemplary embodiment, the first stem SPE1a may perpendicularly intersect the second stem SPE1b. In an exemplary embodiment, the first stem SPE1a may intersect the second stem SPE1b at the center of the first stem SPE1a.

The second sub-pixel electrode SPE2 may include a third stem SPE2a extending in the first direction d1, and a fourth stem SPE2b extending in the second direction d2. In an exemplary embodiment, the third stem SPE2a may perpendicularly intersect the fourth stem SPE2b. In an exemplary embodiment, the third stem SPE2a may intersect the fourth stem SPE2b at the center of the third stem SPE2a.

As a result, the pixel area PG may be divided into first to fourth domain areas DM1 to DM4 by the slit SLT and the first to fourth stems SPE1a, SPE1b, SPE2a and SPE2b.

The first sub-pixel electrode SPE1 may further include a plurality of first branches SPE1c disposed in the first and second domain areas DM1 and DM2. The plurality of first branches SPE1c may have a predetermined angle with reference to the first stem SPE1a or the second stem SPE1b.

The plurality of first branches SPE1c may include a plurality of first sub-branches SPE1c1 disposed in the first domain area DM1, and a plurality of second sub-branches SPE1c2 disposed in the second domain area DM2. In an exemplary embodiment, the plurality of first sub-branches SPE1c1 may be symmetrical with the plurality of second sub-branches SPE1c2 with reference to the second stem SPE1b. In an exemplary embodiment, an included angle a between the plurality of first sub-branches SPE1c1 and the second stems SPE1b may be about 40 degrees to about 45 degrees, for example. In the specification, the included angle is defined as an acute angle of 0 degrees or more and less than 90 degrees. In an exemplary embodiment, an included angle b between the plurality of second sub-branches SPE1c2 and the second stems SPE1b may also be about 40 degrees to about 45 degrees, for example.

The plurality of first branches SPE1c may be spaced apart from each other at a predetermined distance. In an exemplary embodiment, the distance c between the plurality of first branches SPE1c may be about 4 micrometers (μm) to about 8 μm, for example. Further, the plurality of second branches SPE2c may be spaced apart from each other at a predetermined distance. In an exemplary embodiment, the distance d between the plurality of second branches SPE2c may be about 4 μm to about 8 μm, for example.

The plurality of first sub-branches SPE1c1 disposed in the first domain area DM1 may be symmetrical with the plurality of second sub-branches SPE1c2 disposed in the second domain area DM2 with reference to the second stem SPE1b. The plurality of third sub-branches SPE2c1 disposed in the third domain area DM3 may be symmetrical with the plurality of fourth sub-branches SPE2c2 disposed in the fourth domain area DM4 with reference to the fourth stem SPE2b. Further, the plurality of first branches SPE1c disposed in the first and second domain areas DM1 and DM2 may be symmetrical with the plurality of second sub-branches SPE2c disposed in the third and fourth domain areas DM3 and DM4 with reference to the slit SLT.

The second sub-pixel electrode SPE2 may further include a plurality of second branches SPE2c disposed in the third and fourth domain areas DM3 and DM4. The plurality of second branches SPE2c may have a predetermined angle with reference to either the third stem SPE2a or the fourth stem SPE2b.

The plurality of second branches SPE2c may include a plurality of third sub-branches SPE2c1 disposed in the third domain area DM3, and a plurality of fourth sub-branches SPE2c2 disposed in the fourth domain area DM4. In an exemplary embodiment, the plurality of third sub-branches SPE2c1 may be symmetrical with the plurality of fourth sub-branches SPE2c2 with reference to the fourth stem SPE2b. Therefore, the included angle between the plurality of third sub-branches SPE2c1 and the fourth stems SPE2b may be substantially the same as the included angle a between the plurality of first sub-branches SPE1c1 and the second stems SPE1b. Furthermore, the included angle between the plurality of fourth sub-branches SPE2c2 and the fourth stems SPE2b may be substantially the same as the included angle b between the plurality of second sub-branches SPE1c2 and the second stems SPE1b.

The first pixel electrode PE1 may further include a first connection electrode CTa that extends from the contact CT and is directly connected to the first sub-pixel electrode SPE1. Further, the first pixel electrode PE1 may further include a second connection electrode CTb that extends from the contact CT and is directly connected to the second sub-pixel electrode SPE2.

However, the forms, positions, sizes and the like of the first and second connection electrodes CTa and CTb are not limited to those illustrated in FIG. 5. Further, FIG. 5 illustrates a configuration in which the first sub-pixel electrode SPE1 and the contact CT are directly connected to each other via a single first connection electrode CTa, but is limited to thereto. Similarly, FIG. 5 illustrates a configuration in which the second sub-pixel electrode SPE2 and the contact CT are directly connected to each other via a single second connection electrode CTb, but is not limited thereto.

Accordingly, the first sub-pixel electrode SPE1 and the second sub-pixel electrode SPE2 may be directly connected to each other in the circuit area CG through the first connection electrode CTa, the second connection electrode CTb and the contact CT, rather than being directly connected to each other in the pixel area PG.

Figure 6A:
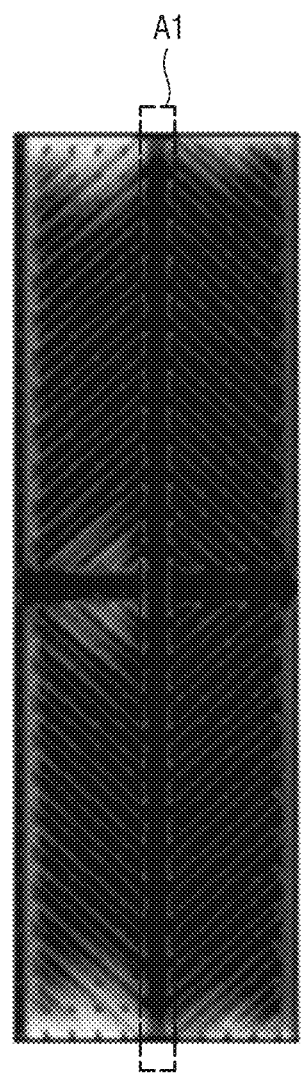
FIG. 6A is a diagram illustrating a low gradation state of a comparative example of the LCD.
Figure 6B:
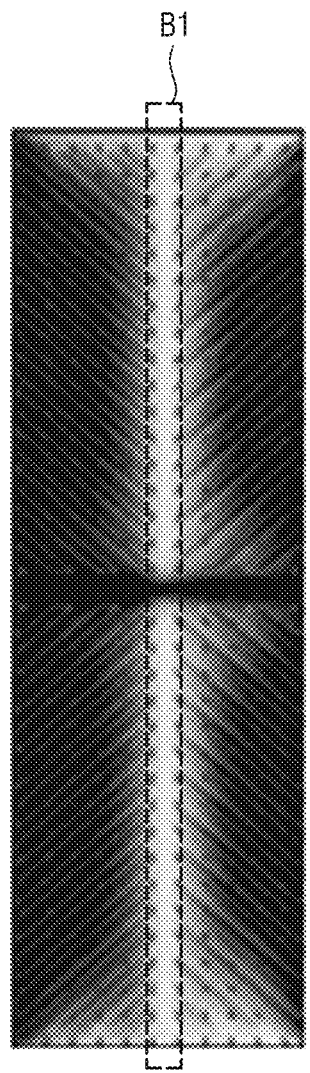
FIG. 6B is a diagram illustrating a low gradation state in an exemplary embodiment of the LCD according to the invention.
Figure 7:
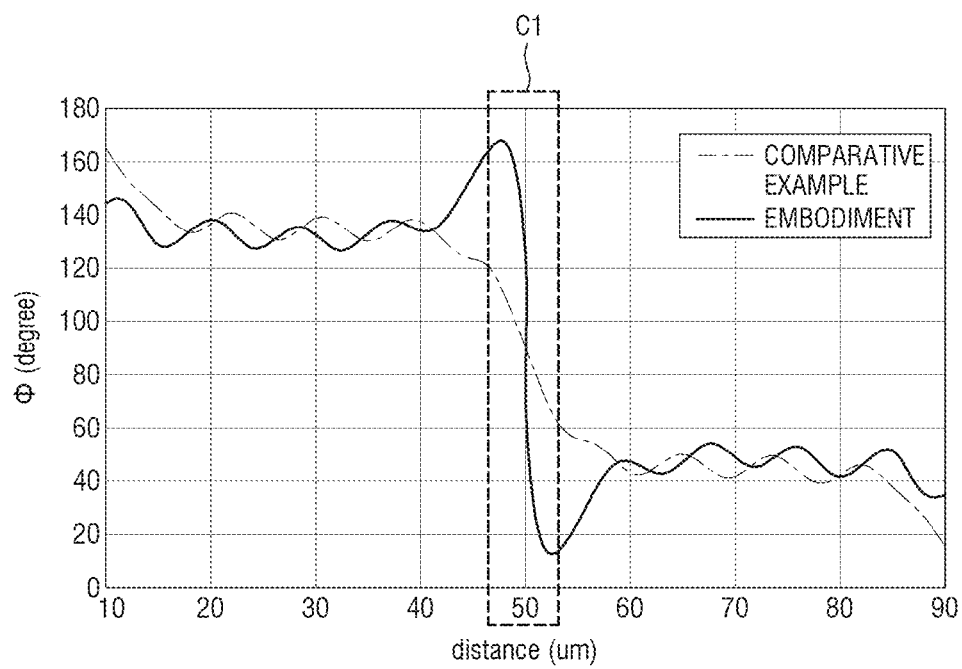
FIG. 7 is a graph obtained by analyzing an alignment direction of the liquid crystals in the low gradation state of the exemplary embodiment of the LCD according to the invention.

FIG. 6A is a diagram illustrating a low gradation state of the LCD according to a comparative example. FIG. 6B is a diagram illustrating a low gradation state in the LCD according to an exemplary embodiment of the invention. FIG. 7 is a graph obtained by analyzing the alignment direction of the liquid crystal in the low gradation state of the LCD according to the exemplary embodiment of the invention. As illustrated in FIG. 7, the distance on the horizontal axis means the distance from the first stem SPE1a in the second direction d2 based on FIG. 1, and the degree on the vertical axis means the azimuthal angle of the liquid crystal molecule 31 (refer to FIG. 2). In the low gradation state, the level of the voltage applied to the first pixel electrode PE1 is assumed to be about 3 volts (V) as an example.

Referring to FIG. 6A, since an area A1 is an area in which no slit is arranged, it corresponds to an area in which a fringe field is generated in relation to the common electrode CE. Thus, in the case of the LCD according to the comparative example, the light leakage phenomenon may occur in the area A1 in the low gradation state.

Referring to FIGS. 5 and 6B, the slit SLT of the first pixel electrode PE1 does not form a fringe field with the common electrode CE. Thus, in the case of the LCD according to the exemplary embodiment of the invention, the light leakage phenomenon does not occur in the area B in the low gradation state.

Referring to FIG. 7, an area C1 corresponds to the area A1 of FIG. 6A and the area B1 of FIG. 6B. More specifically, referring to FIG. 6A and FIG. 7, in the LCD according to an exemplary embodiment of the invention, an average azimuthal angle of a plurality of liquid crystal molecules in the area C1 may be smaller than that of the liquid crystal display according to the comparative example. This means that a plurality of liquid crystal molecules disposed in the area A1 of FIG. 6A behaves to be relatively less than a plurality of liquid crystal molecules disposed in the area B1 of FIG. 6B. Thus, in the LCD according to an exemplary embodiment of the invention, since the first pixel electrode PE1 includes the slit SLT, by controlling the alignment of the plurality of liquid crystal molecules disposed in the area A1, it is possible to consequentially improve the visibility and gamma characteristics. In addition, it is possible to prevent the light leakage phenomenon that may occur in the area A1.

Figure 8A:
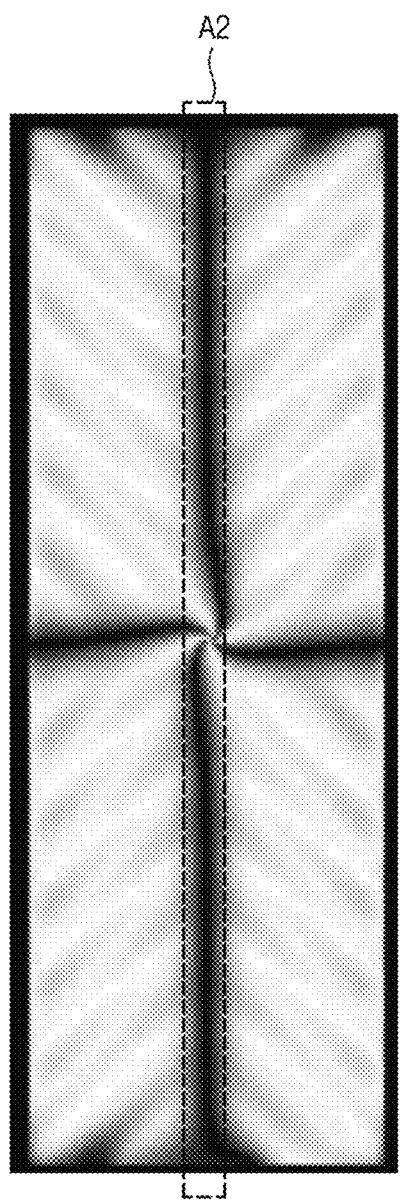
FIG. 8A is a diagram illustrating a high gradation state in the comparative example of the LCD.
Figure 8B:
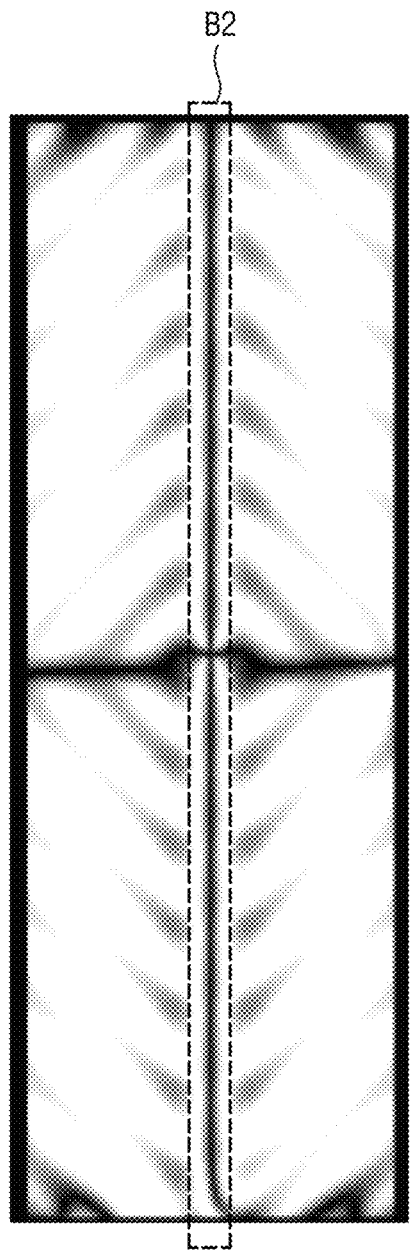
FIG. 8B is a diagram illustrating a high gradation state in an exemplary embodiment of the LCD according to the invention.
Figure 9:
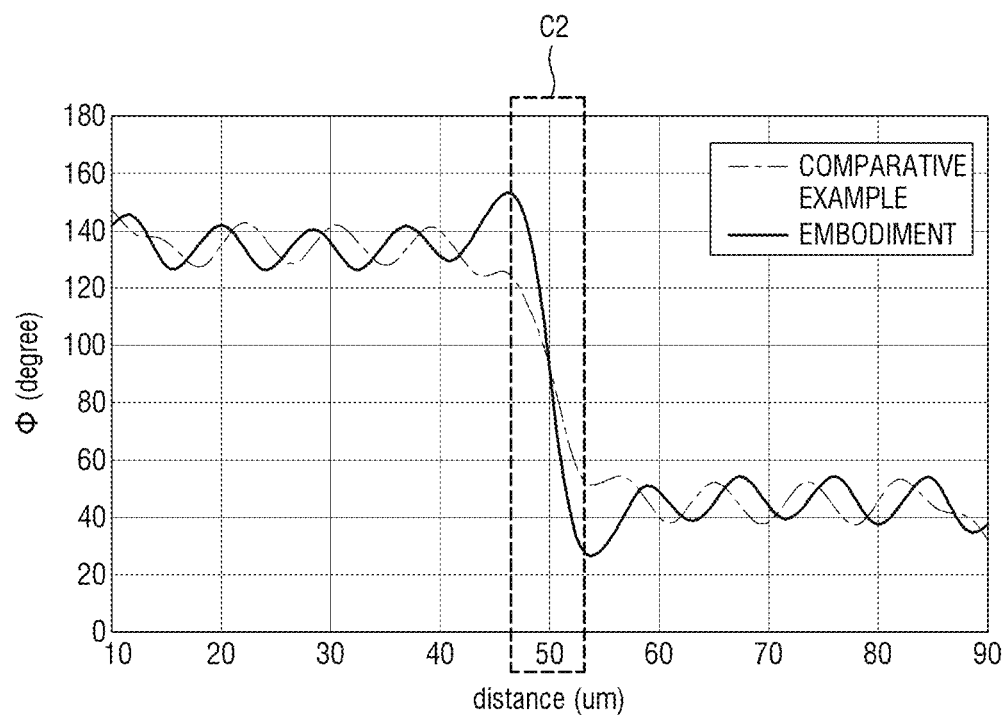
FIG. 9 is a graph obtained by analyzing the alignment direction of liquid crystals in a low gradation state of an exemplary embodiment of the LCD according to the invention.

FIG. 8A is a diagram illustrating a high gradation state in the LCD according to the comparative example. FIG. 8B is a diagram illustrating a high gradation state in the LCD according to an exemplary embodiment of the invention. FIG. 9 is a graph obtained by analyzing the alignment direction of liquid crystals in the low gradation state of the LCD according to an exemplary embodiment of the invention. Referring to FIG. 9, an area C2 corresponds to the area A2 of FIG. 8A and the area B2 of FIG. 8B. The distance (horizontal axis) and the degree (vertical axis) illustrated in FIG. 9 are the same as the distance and degree illustrated in FIG. 7, and the high gradation state illustrates the level of voltage applied to the first pixel electrode PE1 of about 7V, for example.

First, referring to FIG. 9, it is recognized that, in the case of the LCD according to an exemplary embodiment of the invention, the distribution of the liquid crystal molecules having the azimuth angle of about 45 degrees is greater than the case of the LCD according to the comparative example indicated in the area D of FIG. 9. This means that the LCD according to an exemplary embodiment of the invention finally has a relatively high distribution of liquid crystal molecules behaving around the azimuth angle of 45 degrees at which the transmittance of the pixel electrode is maximized. Accordingly, it is recognized that the area B2 of FIG. 8B is relatively brighter than the area A2 of FIG. 8A. That is, it means that the LCD according to an exemplary embodiment of the invention has higher transmittance than the LCD according to the comparative example.

Figure 10:
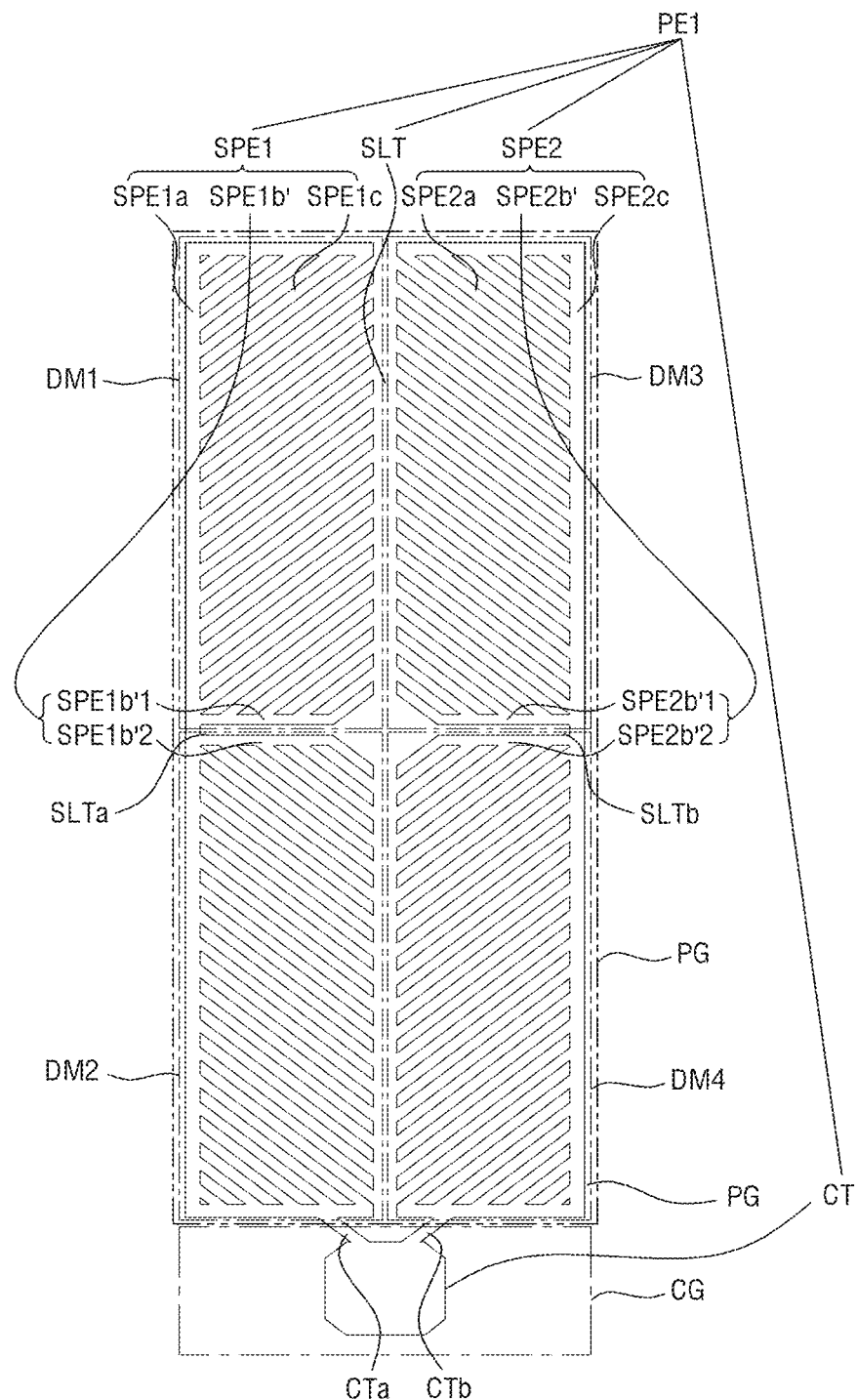
FIGS. 10 and 11 are diagrams illustrating another exemplary embodiment of the first pixel electrode illustrated in FIG. 1.
Figure 11:
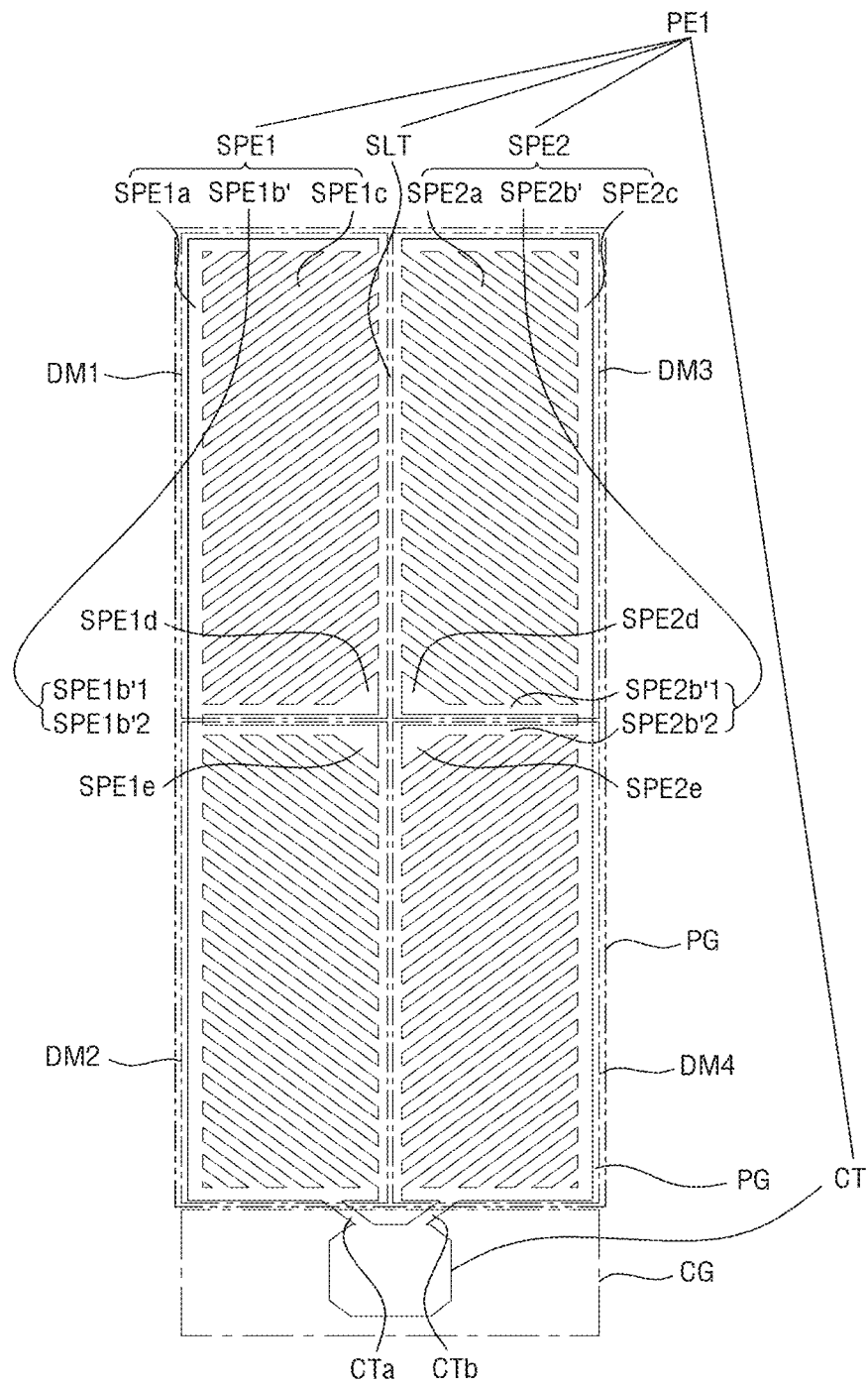

FIGS. 10 and 11 are diagrams illustrating another exemplary embodiment of the first pixel electrode illustrated in FIG. 1. In FIG. 10 and FIG. 11, the repeated contents of those explained in FIGS. 1 to 9 will be omitted.

First, referring to FIG. 10, a second stem SPE1b' may include a first sub-stem SPE1b' 1, a second sub-stem SPE1b'2 and a first horizontal slit SLTa. The first horizontal slit SLTa may be defined between the first sub-stem SPE1b'1 and the second sub-stem SPE1b'2.

The fourth stem SPE2b' may include a third sub-stem SPE2b'1, a fourth sub-stem SPE2b'2 and a second horizontal slit SLTb. The second horizontal slit SLTb may be defined between the third sub-stem SPE2b'1 and the fourth sub-stem SPE2b'2.

That is, unlike the second stem SPE1b and the fourth stem SPE2b illustrated in FIG. 1, the second stem SPE1b' and the fourth stem SPE2b' illustrated in FIG. 10 may further include first and second horizontal slits SLTa and SLTb.

Referring to FIG. 11, the first sub-pixel electrode SPE1 may further include a third branch SPE1d and a fourth branch SPE1e. Further, the second sub-pixel electrode SPE2 may further include a fifth branch SPE2d and a sixth branch SPE2e.

Figure 12:
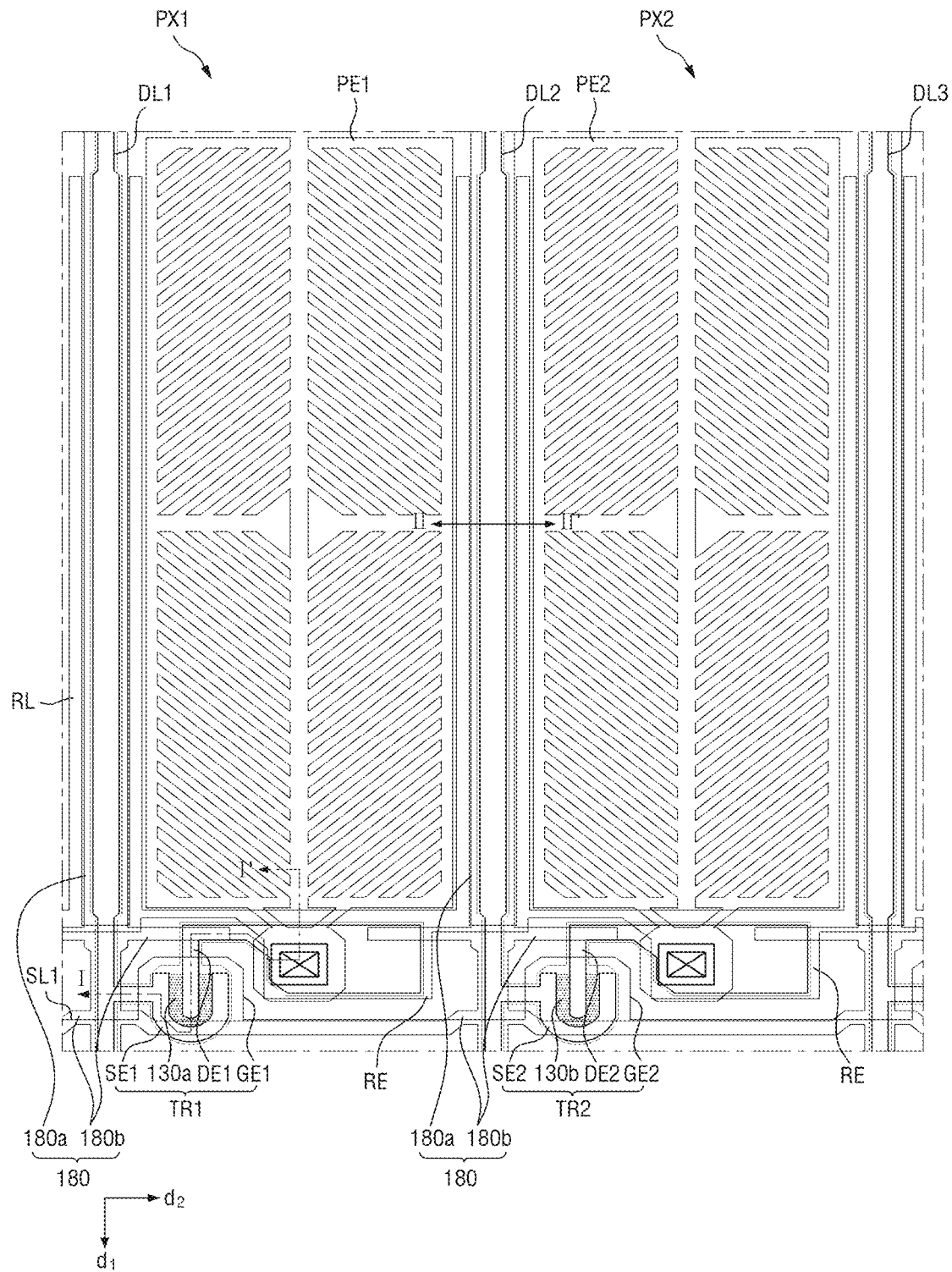
FIG. 12 is a plan view illustrating another exemplary embodiment of an LCD according to the invention.
Figure 13:
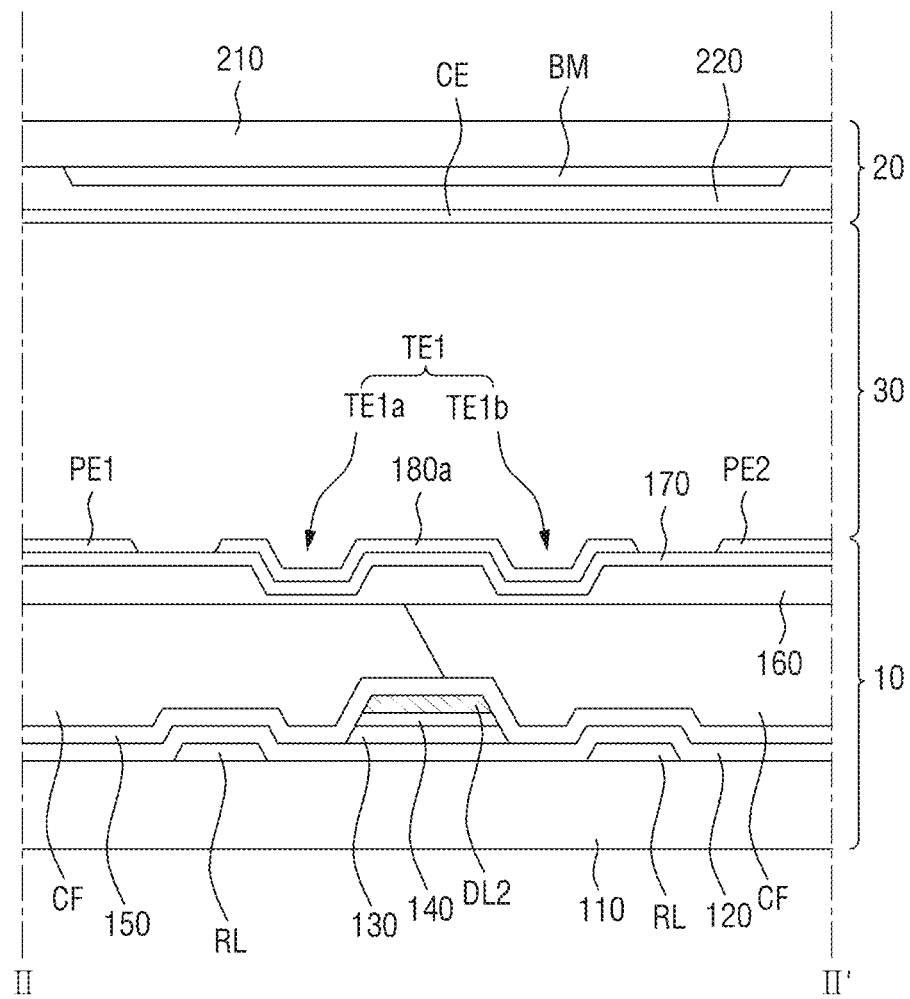
FIG. 13 is a cross-sectional view of an exemplary embodiment of the LCD taken along line II-II' of FIG. 12.

FIG. 12 is a plan view illustrating an LCD according to another exemplary embodiment of the invention. FIG. 13 is an example of a cross-sectional view taken along line II-IF of FIG. 12. However, the repeated descriptions of the contents explained in FIGS. 1 to 11 will be omitted. Also, for convenience of explanation, reference numerals indicating the same targets are made to coincide with those used in FIGS. 1 to 11.

An LCD according to another exemplary embodiment of the invention may include a first pixel PX1 and a second pixel PX2. The first pixel PX1 may be adjacent to the second pixel PX2.

Referring to FIG. 12, the first pixel PX1 may be electrically connected to the first scan line SL1 and the first data line DL1, and the second pixel PX2 may be electrically connected to the first scan line SL1 and the second data line DL2.

The first pixel PX1 may include a first switching element TR1 and a first pixel electrode PE1. The first gate electrode GE1 of the first switching element TR1 may be electrically connected to the first scan line SL1, and the first source electrode SE1 thereof may be electrically connected to the first data line DL1. The first drain electrode DE1 of the first switching element TR1 may be electrically connected to the first pixel electrode PE1.

As a result, the first switching element TR1 is turned on in accordance with the scan signal provided from the first scan line SL1, and may provide the data signal provided from the first data line DL1 to the first pixel electrode PE1.

The second pixel PX2 may include a second switching element TR2 and a second pixel electrode PE2. The second gate electrode GE2 of the second switching element TR2 may be electrically connected to the first scan line SL1, and the second source electrode SE2 may be electrically connected to the second data line DL2. The second drain electrode DE2 of the second switching element TR2 may be electrically connected to the second pixel electrode PE2.

As a result, the second switching element TR2 is turned on in accordance with the scan signal provided from the first scan line SL1, and may provide the data signal, which is provided from the second data line DL2, to the second pixel electrode PE2.

In an exemplary embodiment, the first pixel electrode PE1 may have the same shape as the second pixel electrode PE2. Since the first pixel electrode PE1 and the second pixel electrode PE2 have the same shape as the first pixel electrode PE1 described in FIGS. 1 and 5, the shapes of the first pixel electrode PE1 and the second pixel electrode PE2 will not be described.

A first trench TE1 may be defined in an organic insulating film 160 between the first pixel electrode PE1 and the second pixel electrode PE2. The first trench TE1 may include first and second sub-trenches TE1a and TE1b. The first sub-trench TE1a may be spaced apart from the second sub-trench TE1b by a predetermined distance.

Each of the first and second sub-trenches TE1a and TE1b may at least partially overlap the second data line DL2 in the plan view. The first sub-shielding electrode 180a may be disposed on the first trench TE1. Further, the first sub-shielding electrode 180a may overlap the first data line DL1 and the second data line DL2 in the plan view.

The first sub-shielding electrode 180a may be disposed on the first trench TE1. Thus, the first sub-shielding electrode 180a may include a portion disposed at the height that is lower than the first pixel electrode PE1 in the adjacent first pixel PX1, and the second pixel electrode PE2 in the second pixel PX2.

The plurality of liquid crystal molecules disposed in the first trench TE1 area may have a predetermined tilt angle. When a plurality of liquid crystal molecules disposed in the first trench TE1 area have a predetermined tilt angle, visibility of the outer area of the first pixel PX1 and the second pixel PX2, more specifically, visibility of the side surface area in the outer area may be improved.

Figure 14:
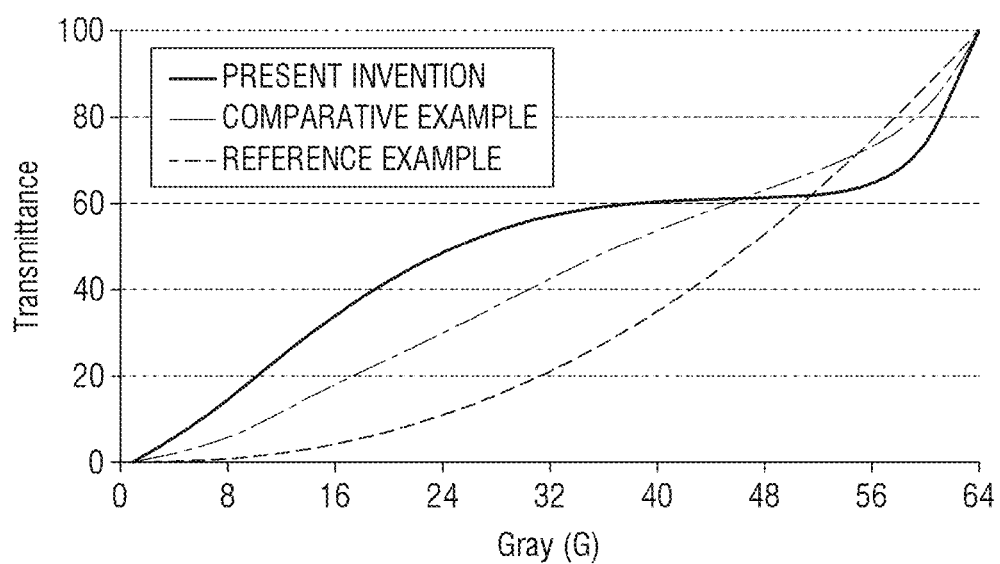
FIG. 14 is a diagram for explaining the effect of another exemplary embodiment of the LCD according to the invention illustrated in FIG. 12.

FIG. 14 is a diagram for explaining the effect of the LCD according to another exemplary embodiment of the invention illustrated in FIG. 12. The reference example of FIG. 14 illustrates the front transmittance of the LCD according to an exemplary embodiment of the invention.

Referring to FIG. 14, it is recognized that, in the case of the LCD according to another exemplary embodiment of the invention, the transmittance in the low gradation is relatively closer to the front transmittance than the case of the LCD according to the comparative example. That is, in the liquid crystal display according to another exemplary embodiment of the invention, since the side transmittance in the low gradation is closer to the front transmittance as compared to the case of the comparative example, it is recognized that the side visibility is relatively excellent.

Figure 15:
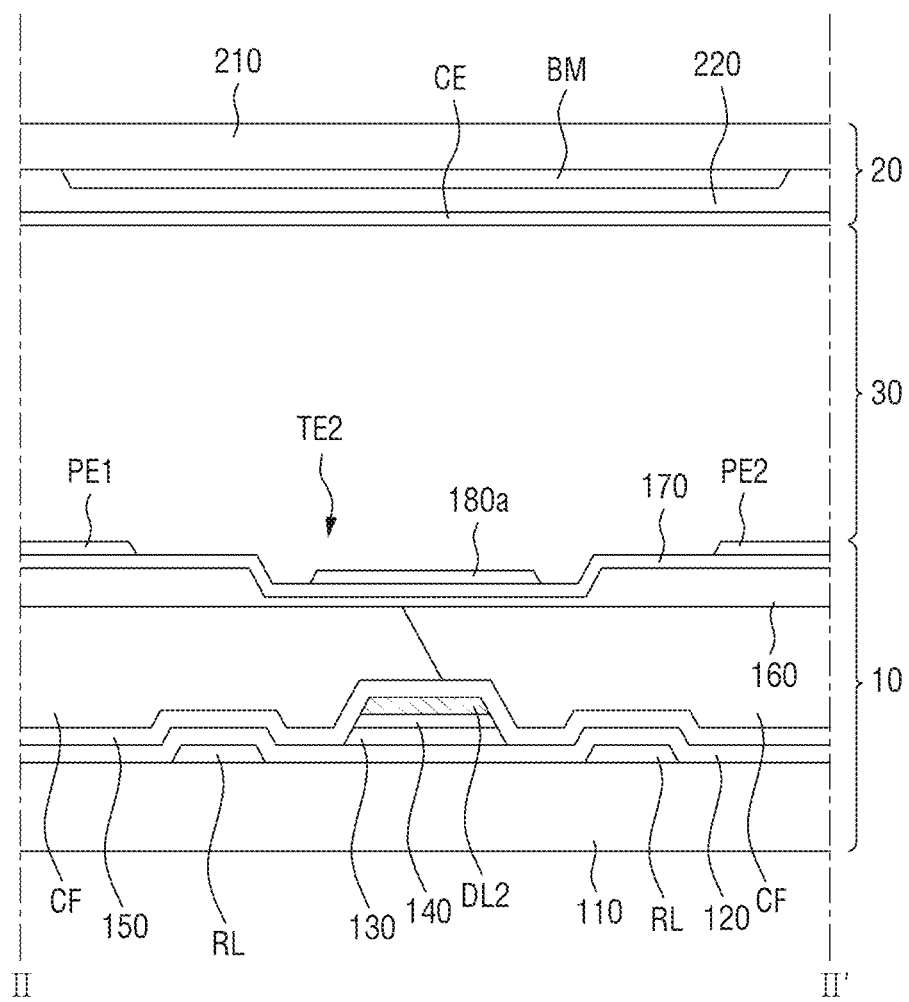
FIGS. 15 to 17 are the cross-sectional view other exemplary embodiments of the LCD taken along line II-II' of FIG. 12.
Figure 16:
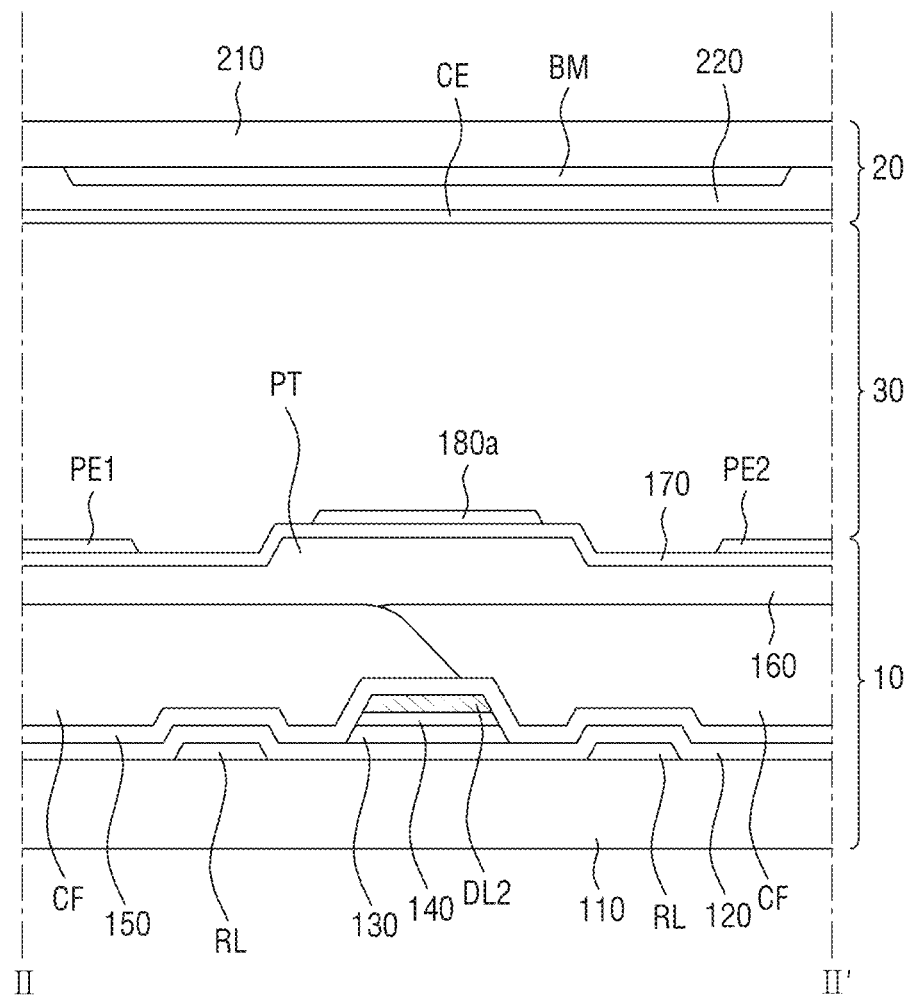
Figure 17:
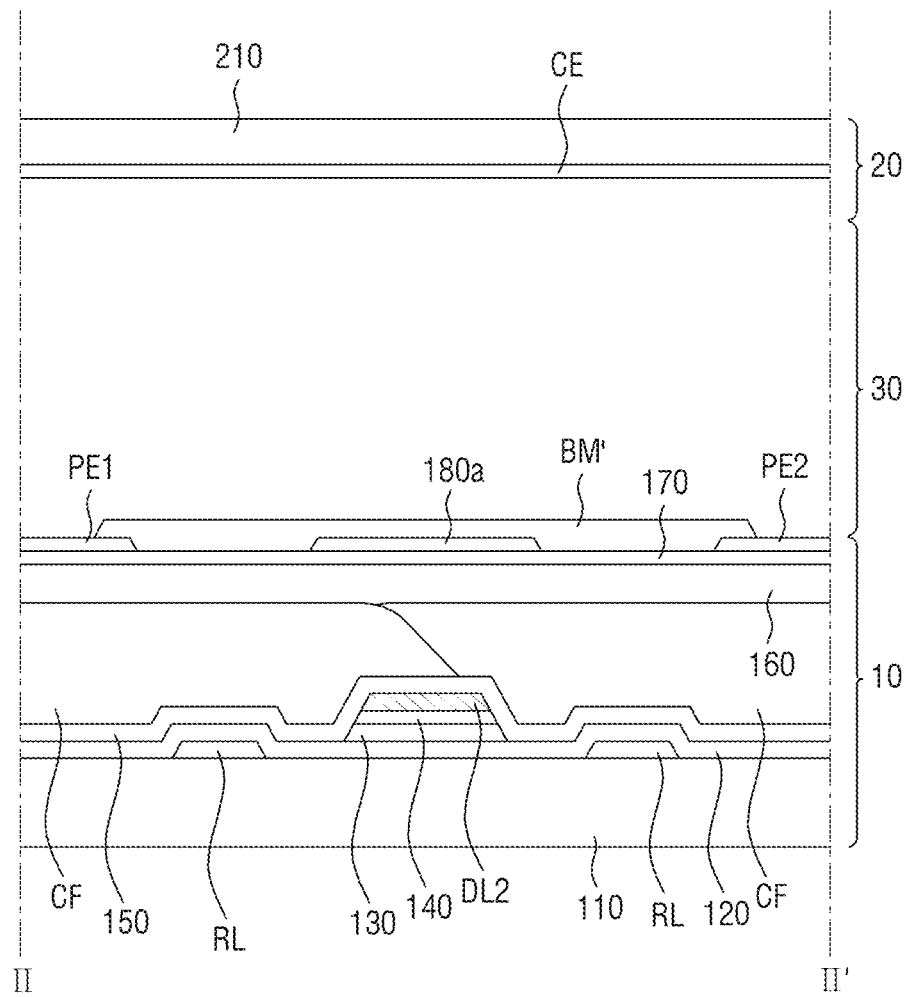

FIGS. 15 to 17 illustrate another exemplary embodiment of the cross-sectional view taken along line II-II' of FIG. 12.

Referring to FIG. 15, the organic insulating film 160 may include a second trench TE2. The second trench TE2 does not include a sub-trench, unlike the first trench TE1 illustrated in FIG. 13. Accordingly, the height of the area where the second trench TE2 is defined may be lower than the area where the adjacent first pixel PX1 and the second pixel PX2 are disposed.

Referring to FIG. 16, the organic insulating film 160 may include a protrusion PT. The first sub-shielding electrode 180a may be disposed on the protrusion PT. As a result, the height of the area where the protrusion PT is disposed may be higher than the area where the adjacent first pixel PX1 and the second pixel PX2 are disposed.

Referring to FIG. 17, a black matrix BM' may be disposed on the lower display panel 10. More specifically, the black matrix BM' may be disposed to overlap the second data line DL2 in the plan view. As a result, it is possible to prevent the light leakage phenomenon which may occur between the first pixel electrode PE1 and the second pixel electrode PE2.

Consequently, the area where the black matrix BM' is disposed corresponds to the outside of the first pixel PX1 and the second pixel PX2, more specifically, the side area. That is, since the black matrix BM' is disposed, the height of the side areas of the first pixel PX1 and the second pixel PX2 may be relatively higher than the peripheral area.

As a result, as the heights of the side areas of the first pixel PX1 and the second pixel PX2 of both of FIGS. 15 to 17 are different from the height of the peripheral area, a plurality of liquid crystal molecules disposed in the side surface areas of the first pixel PX1 and the second pixel PX2 may have a predetermined tilt angle. Thus, the side visibility of the LCD according to the exemplary embodiment of the invention may be improved.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display device comprising:
    a first substrate; and
    a first pixel which is disposed on the first substrate, and includes a pixel area and a circuit area adjacent to the pixel area,
    wherein the first pixel further comprises a first pixel electrode in which a slit extending in a first direction is defined, and which includes a first sub-pixel electrode disposed on one side of the slit, and a second sub-pixel electrode disposed on another side of the slit,
    the slit, the first sub-pixel electrode and the second sub-pixel electrode are disposed in the pixel area,
    the first pixel includes a switching element in the circuit area, the switching element having a drain electrode overlapping a contact of the circuit area, and
    the first sub-pixel electrode and the second sub-pixel electrode are directly connected to each other in the contact.

2. The liquid crystal display device of claim 1, wherein the first sub-pixel electrode comprises a first stem extending in the first direction, a second stem extending in a second direction intersecting the first direction, and a plurality of first branches extending from at least one of the first stem and the second stem, and
    the second sub-pixel electrode comprises a third stem extending in the first direction, a fourth stem extending in the second direction, and a plurality of second branches extending from at least one of the third stem and the fourth stem.

3. The liquid crystal display device of claim 1, wherein the first sub-pixel electrode is symmetrical with the second sub-pixel electrode with reference to the slit.

4. The liquid crystal display device of claim 1, wherein the first pixel electrode further comprises a contact disposed in the circuit area, and
    the first sub-pixel electrode and the second sub-pixel electrode are directly connected to each other in the contact.

5. The liquid crystal display device of claim 4, wherein the first pixel further comprises a switching element which is disposed in the circuit area and is electrically connected to the contact.

6. The liquid crystal display device of claim 1, further comprising:
    a scan line which is disposed on the first substrate and extends in a second direction different from the first direction;
    a first insulating film disposed on the scan line;
    a data line which is disposed on the first insulating film and extends in the first direction;
    a second insulating film disposed on the data line; and
    a third insulating film disposed on the second insulating film,
    wherein the first pixel electrode is disposed on the third insulating film.

7. The liquid crystal display device of claim 6, further comprising:
    a color filter disposed between the second insulating film and the third insulating film.

8. The liquid crystal display device of claim 6, further comprising:
    a shielding electrode which is disposed on the third insulating film and extends along the first direction,
    wherein at least a part of the shielding electrode overlaps the data line.

9. The liquid crystal display device of claim 6, further comprising:
    a second pixel which includes a second pixel electrode adjacent to the first pixel electrode,
    wherein the third insulating film comprises at least one trench area disposed between the first pixel electrode and the second pixel electrode.

10. The liquid crystal display device of claim 6, further comprising:
    a second pixel which includes a second pixel electrode adjacent to the first pixel electrode,
    wherein the third insulating film comprises at least one protruding area disposed between the first pixel electrode and the second pixel electrode.

11. The liquid crystal display device of claim 6, further comprising:
    a second pixel which includes a second pixel electrode adjacent to the first pixel electrode, and
    a black matrix which is disposed on the first pixel electrode and the second pixel electrode, and overlaps the data line.

12. The liquid crystal display device of claim 1, further comprising:
    a second substrate which faces the first substrate;
    a black matrix which is disposed on the second substrate; and
    a common electrode which is disposed on the black matrix,
    wherein the common electrode at least partially overlaps the first pixel electrode.

13. A liquid crystal display device comprising:
    a first substrate; and
    a first pixel which is disposed on the first substrate and is defined by a circuit area and a pixel area adjacent to the circuit area,
    wherein the first pixel comprises a first pixel electrode which includes a switching element disposed in the circuit area and a contact electrically connected to the switching element,
    a slit extending in a first direction is defined in the first pixel electrode and the first pixel electrode further comprises a first sub-pixel electrode disposed on one side of the slit, and a second sub-pixel electrode disposed on another side of the slit,
    the slit, the first sub-pixel electrode and the second sub-pixel electrode are disposed in the pixel area, and the contact is disposed in the circuit area, and
    the first sub-pixel electrode and the second sub-pixel electrode are directly connected to each other in the contact.

14. The liquid crystal display device of claim 13, wherein the first sub-pixel electrode comprises a first stem extending in the first direction, a second stem extending in a second direction intersecting the first direction, and a plurality of first branches extending from at least one of the first stem and the second stem, and the second sub-pixel electrode includes a third stem extending in the first direction, a fourth stem extending in the second direction, and a plurality of second branches extending from at least one of the third stem and the fourth stem.

15. The liquid crystal display device of claim 13, further comprising:

a scan line which is disposed on the first substrate and extends in a second direction different from the first direction;

a data line which is disposed on the scan line so as to be insulated from the scan line and extends in the first direction;

a first passivation film disposed on the data line; and an organic insulating film disposed on the first passivation film, wherein the first pixel electrode is disposed on the organic insulating film.

16. The liquid crystal display device of claim 15, further comprising:

a color filter disposed between the first passivation film and the organic insulating film.

17. The liquid crystal display device of claim 15, further comprising:

a shielding electrode which is disposed in the same layer as the first pixel electrode, and includes a first sub-shielding electrode extending along the first direction, and a second sub-shielding electrode extending along the second direction, wherein the first sub-shielding electrode overlaps the data line, and the second sub-shielding electrode is disposed in the circuit area.

18. The liquid crystal display device of claim 15, further comprising:

a second pixel which includes a second pixel electrode adjacent to the first pixel electrode, wherein the organic insulation film comprises at least one protruding area disposed between the first pixel electrode and the second pixel electrode, or at least one trench area disposed between the first pixel electrode and the second pixel electrode.

19. The liquid crystal display device of claim 15, further comprising:

a second pixel which comprises a second pixel electrode adjacent to the first pixel electrode, and a black matrix which is disposed on the first pixel electrode and the second pixel electrode, and overlaps the data line.

20. The liquid crystal display device of claim 13, further comprising:

a second substrate which faces the first substrate;

a black matrix which is disposed on the second substrate; and a common electrode which is disposed on the black matrix, wherein the common electrode at least partially overlaps the first pixel electrode.

* * * * *